United States Patent [19]
Chaney

[11] 3,984,918
[45] Oct. 12, 1976

[54] INCLINOMETER
[75] Inventor: Preston E. Chaney, Dallas, Tex.
[73] Assignee: Sun Oil Company (Delaware), Dallas, Tex.
[22] Filed: Oct. 2, 1974
[21] Appl. No.: 511,397

[52] U.S. Cl. .............................. 33/366; 73/516 LM
[51] Int. Cl.² .............................................. G01C 9/06
[58] Field of Search ................ 33/366; 73/516 LM; 336/130

[56] References Cited
UNITED STATES PATENTS

| | | | |
|---|---|---|---|
| 3,131,565 | 5/1964 | Amlie | 73/516 LM |
| 3,209,600 | 10/1965 | Stiles et al. | 73/516 LM |
| 3,260,121 | 7/1966 | Johnston | 73/516 LM X |
| 3,839,904 | 10/1974 | Stripling | 73/516 LM X |

FOREIGN PATENTS OR APPLICATIONS
275,952   7/1970   U.S.S.R. .............................. 33/366

Primary Examiner—Charles E. Phillips
Attorney, Agent, or Firm—J. Edward Hess; Donald R. Johnson; Gary V. Pack

[57] ABSTRACT

Disclosed is an inclinometer particularly adapted for use as a top-hole indicator in drilling operations. The inclinometer employs a ferrofluid in a closed tube; the fluid serves as an angle-sensitive movable core of a differential transformer. The secondary coils of the transformer are wrapped around the tube; the primary coil is wrapped around a core piece or the tube. Equipment is provided for comparing the outputs of the secondary coils to produce an angle signal. A sturdy construction for downhole use is disclosed.

1 Claim, 7 Drawing Figures

INCLINOMETER

BACKGROUND OF THE INVENTION

This invention relates to inclinometers, and is particularly concerned with inclinometers which are suitable for use in downhole instrumentation of oil and gas wells during the process of drilling and during directional survey work in completed wells.

Directional drilling of oil and gas wells is a widely employed technique; it is routinely used to achieve drilling coverage of a maximum area from a single offshore drilling platform. In the course of directional drilling it is necessary to measure and control the angle at which the bit is addressing the strata substantially continuously. In addition, wells which are intended to be substantially vertically drilled sometimes deviate from the vertical for various reasons and it is necessary to determine the actual course of the well after completion. Inclinometers are used to make such measurements.

The environment at the bottom of a well being drilled is a severe one for an inclinometer. In addition to elevated temperatures (typically in the neighborhood of 300°F.), severe vibrational accelerations are often encountered, for reasons outlined below.

It is becoming increasingly popular to perform high angle directional drilling by the use of downhole mud motors or mud turbines, instead of applying the drilling torque at the surface and transmitting it through the drill string to the bit. With mud motors, the drill pipe is not rotated, and is hence not subjected to continuous and severe bending stresses inherent in rotation of a shaft in a curved hole. In addition, the problem of key seating is eliminated, since the drill pipe is not in rotating contact with the walls of the bore hole.

In mud motor or mud turbine directional drilling, the primary determinant of the angle at which the bit addresses the strata is the degree of bend provided in a section of drill pipe (a "bent sub") at the lower end of the drill string just above the motor. But it is not the sole determinant, because the reactive torque applied by the bit tends to rotate the bent sub away from its planned position. Since the reactive torque is not constant, because of variations in what the bit encounters and variations in mud flow through the motor, the angular displacement of the bit and bent sub is not constant. It therefore becomes necessary to determine, substantially continuously, the relative positions of the high side of the hole and the bent sub so that a corrective torque can be applied to the drill string at the surface to bring the bit to, and hold it at, the desired angle of address.

Inclinometers, together with associated telemetry and control equipment, are used for this purpose. Because of their application, such inclinometers are often called "top hole indicators."

From the foregoing outline, it can be seen that a top hole indicator is necessarily subjected to severe vibrational conditions by the interaction of the bit, hole bottom, and mud motor.

Inclinometers employed heretofore have relied on pendulums rotatably or otherwise mounted on shafts and ancillary equipment such as bearings. In practice, such devices are less than satisfactory because the pendulum must have an appreciable mass in order to maintain its vertical position, and the acceleration forces on this mass caused by the vibratory environment rapidly wear the support system of the pendulum, thus inducing uncompensated errors into the measurements, and rendering the equipment unfit for use in an undesirably short time.

SUMMARY OF THE INVENTION

In accordance with the present invention, an improved inclinometer is provided which is especially suitable for use as a top hole indicator. The inclinometer of the invention has no mechanical moving parts to wear under the vibratory stresses of a drilling environment. The angle measurement made by the instrument is produced directly as an electrical signal, a convenient form for telemetric transmission to the surface and for processing for servo-control and information display purposes. The inclinometer in its preferred form is of rugged compact construction, and is thus particularly suitable for downhole employment.

In the inclinometer of the invention, a liquid is used for angle detection purposes. The liquid is carried in a closed planar loop which is symmetrical about at least one axis. Inclination of the loop (caused by inclination of the equipment on which it is carried) in the plane in which it lies causes relative displacement of the liquid and the loop. If opposite vertically oriented portions of the loop are somewhat arbitrarily designated "legs", the liquid level in the legs will be unequal upon inclination of the loop. On the other hand, if the loop is inclined in a direction at right angle to the plane in which it lies, the liquid level in the legs of the loop remains equal.

The liquid employed in accordance with the invention is a ferrofluid. A ferrofluid is a colloidal suspension or dispersion of submicron-sized ferromagnetic (ferrite) particles in a carrier fluid, with a dispersing agent added to prevent flocculation. In addition to having the properties of a liquid, a ferrofluid has the property of responding to magnetic fields just as a solid ferromagnetic material does.

The ferrofluid operates in the apparatus of the invention as a movable core of a differential transformer. Exciter coil means are provided for establishing a magnetic flux pattern in the ferrofluid core. The exciter coil means may be a coil wrapped directly around the loop containing the ferrofluid or may be a coil wrapped around an auxiliary magnetizable element, such as a pole piece, magnetically coupled to the fluid.

The relative position of the flux pattern in the ferrofluid core with respect to the loop varies with the inclination of the loop, as a consequence of the above-mentioned relative displacement of the liquid upon inclination of the loop. Detector coil means are provided on opposite sides of an axis of symmetry of the loop (i.e., on opposite "legs" of the loop). The current induced in the secondary or detector coils by magnetic coupling through the liquid core with the exciter coil means varies with the relative position of the liquid core in the loop, both in magnitude and phase.

Means are provided in accordance with the invention for detecting the currents induced in the detector coil means, for comparing them, and for producing a difference signal for control purposes, for information display or recording or for further processing.

In order to provide three-dimensional measurement of inclination, a pair of the inclinometers just described are employed. They are mounted at an angle to one another, and preferably orthogonally. The inclination signals produced by each inclinometer may be combined manually or electrically to yield a resultant representative of the direction or angle at which the bit is addressing the strata at the hole bottom.

The inclinometers of the invention are resistant to vibration in several respects. By employing a ferrofluid which is viscous, such as a high viscosity silicone base fluid, damping of vibration of the liquid transformer core attributable to vibratory movement of the liquid in the loop is obtained. In addition, the absence of mechanical parts which move with respect to each other eliminates wear and mechanical misalignment which in prior art devices led to uncompensated errors and eventually inoperativeness.

It is an object of the present invention to provide an improved inclinometer especially suited for use as a top hole indicator.

It is a further object of the invention to provide an inclinometer of improved ruggedness, simplicity of construction, and resistance to wear under vibrational stresses.

Another object of the invention is the provision of an inclinometer capable of producing angle signals in electrical form suitable for read-out or employment at a location remote from the inclinometer itself.

The foregoing objects and purposes, together with other objects and purposes, may best be understood from a consideration of the detailed description which follows, together with the accompanying drawings.

tion with FIG. 6, loop 11 may be other than circular in shape, if desired.) In order to improve linearity of response, it is preferred that loop or tube 11 be uniform in cross-section.

Loop 11 is partially filled with a ferrofluid 12. The extent to which the loop is filled may vary somewhat depending upon the configuration of the loop and the positioning and proportioning of the coils described below. In the preferred embodiments loop 11 is approximately one-half filled; generally speaking the range of filling should fall between about 40% and about 55%.

As is known, ferrofluids are colloidal dispersions of ferromagnetic particles, such as ferrites, with a particle size of about 100 A, and a number concentration on the order of $10^{17}$ per cm$^3$. The particles are dispersed in a carrier fluid such as water, kerosene, silicone base liquid or fluorocarbon base liquid, and a dispersing agent, such as oleic acid in the case of kerosene, is employed to prevent agglomeration of the particles under the influence of magnetic fields. The characteristics of ferrofluids are discussed in a publication entitled "Magnetic Fluids" by R. E. Rosensweig, Revised October 1969, reprinted from International Science and Technology, N.Y., N.Y.

Available ferrofluids include those with the following nominal physical properties:

| | | Saturation Magnetization | | | | |
|---|---|---|---|---|---|---|
| | 100 Gauss | 200 Gauss | 300 Gauss | 400 Gauss | 500 Gauss | 600 Gauss |
| Viscosity*, Centipoise at 25°C | | | | | | |
| 1 Kerosene Base | 2.0 cp | 2.5 cp | 3.0 cp | 5.0 cp | 12.0 cp | 27.0 cp |
| 2 Water Base | 1.2 cp | 7.0 cp | 14.0 cp | 36.0 cp | 75.0 cp | 225.0 cp |
| 3 Light Silicone Base | 0.6 cp | 0.7 cp | 0.9 cp | 1.4 cp | 3.6 cp | 8.0 cp |
| 4 Heavy Silicone Base | 14,000 cp | 18,000 cp | 21,000 cp | 36,000 cp | 84,000 cp | 200,000 cp |
| 5 Fluorocarbon Base | 2,000 cp | 2,500 cp | 3,000 cp | 5,000 cp | 12,000 cp | 27,000 cp |
| Specific Gravity (25°C/4°C) | | | | | | |
| 1 Kerosene Base | 0.95 | 1.05 | 1.15 | 1.25 | 1.36 | 1.46 |
| 2 Water Base | 1.08 | 1.18 | 1.28 | 1.38 | 1.48 | 1.58 |
| 3 Light Silicone Base | 0.87 | 0.97 | 1.08 | 1.18 | 1.29 | 1.40 |
| 4 Heavy Silicone Base | 1.18 | 1.28 | 1.37 | 1.47 | 1.57 | 1.67 |
| 5 Fluorocarbon Base | 1.97 | 2.05 | 2.12 | 2.20 | 2.28 | 2.36 |

*Brookfield, Shear rate > 10 sec$^{-1}$

DESCRIPTION OF THE PREFERRED EMBODIMENTS

Figure 1:
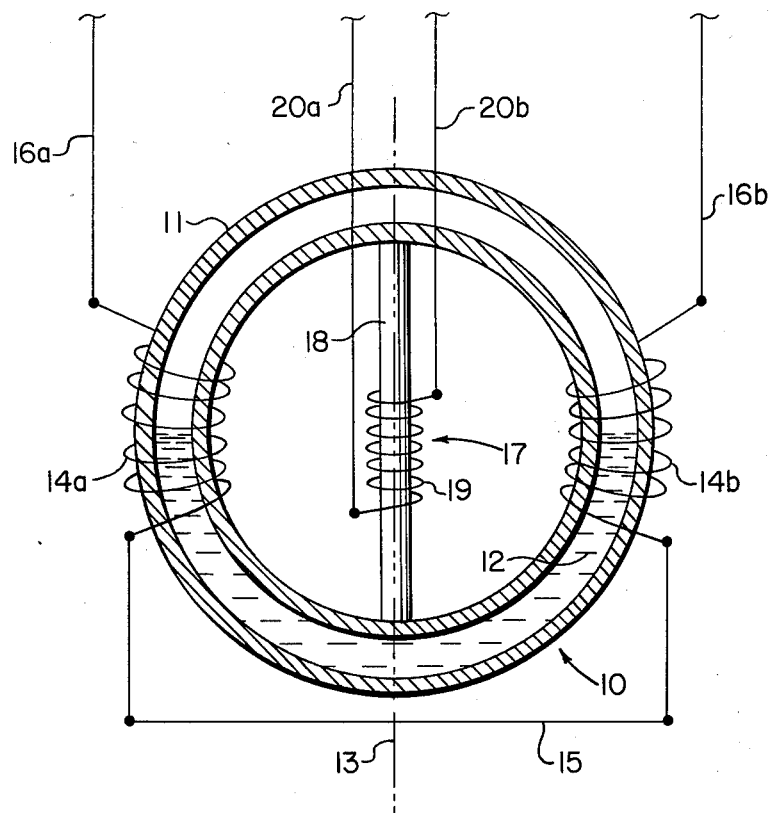
FIG. 1 is a diagrammatic elevational view of a preferred embodiment of the inclinometer of the invention.

Attention is first directed to FIG. 1, in which the inclinometer of the invention is generally designated at 10. It includes a tube or loop 11 of non-magnetic material which is hollow, fluid tight, and substantially circular in configuration. (As is discussed below in connec- Of these, those numbered 4 and 5 with saturations of 100–500 Gauss are particularly suitable for use in inclinometers of the invention employed as top hole indicators, because of their low volatility, high boiling point, and high viscosity.

The loop 11 of FIG. 1, being circular, has an infinite number of axes of symmetry, one of which is indicated in the FIG. by the dashed line 13. Other configurations of loops may have fewer axes of symmetry, but in accordance with the invention, the loop employed should have at least one axis of symmetry, which is utilized as a line of reference for locating other components of the device. When the loop 11 is neutrally oriented with respect to gravity, it is preferred that the axis of symmetry selected for use as a line of reference be vertically oriented, and this condition is illustrated in FIG. 1.

On each side of axis of symmetry 13, detector coils 14a, 14b are wound around loop 11. It is preferred that the windings of coils 14a and 14b be equal in length and equally spaced from the axis of symmetry. It is also preferred that coils 14a and 14b be wound about the loop with opposite "hands" and with one pair of ends of the coils connected together electrically, as by line 15. The other ends of coils 14a, 14b, are connected to instrumentation equipment yet to be described by lines 16a, 16b. These constructional arrangements simplify the equipment and procedures necessary for deriving a comparison signal from the signals developed in coils 14a, 14b.

In accordance with the invention, exciter coil means, designated generally as 17, are provided for creating an oscillating magnetic field in the body of ferrofluid 12. In the embodiment of FIG. 1, the exciter coil means 17 comprise an iron core 18, around which is wound an exciter coil 19. Leads 20a, 20b are provided for connecting coil 19 to an oscillator or other driver. (As can be seen from FIG. 6 and the discussion of that FIG. below, the exciter coil means may alternately comprise a coil wound directly around a portion of the loop.) Core 18 is positioned on an axis of loop 11, and the axis it is positioned upon is the selected axis of symmetry 13.

From the foregoing it can be seen that the inclinometer 10, considered as an electromagnetic device, is a differential transformer with a liquid core, or, stated differently, a pair of liquid core transformers with a common primary winding and series-connected oppositely wound secondary windings. Under the latter view, one transformer lies on each side of axis of symmetry 13.

A consideration of FIG. 1 will reveal that with the inclinometer oriented with its axis of symmetry 13 vertical, voltages and currents which are in phase and are of equal magnitude but opposite sign will be induced in detector coils 14a and 14b upon application of an oscillating voltage and current to exciter coil 19. This is the case because the only physical difference in the two transformers is the oppositeness of the direction of their windings. The amount of ferromagnetic core material (core 18 and ferroliquid 12) linking the primary and secondary coils of each transformer is the same.

If the inclinometer is now inclined in the plane in which it lies so that axis of symmetry 13 is away from the vertical, the identity of the two transformers will be destroyed. The ferrofluid 12, being a liquid, will continue to seek out and occupy the lowest portion of loop 11, but now the lowest portion is a different part of the loop than it was when axis 13 was vertical. The amount of ferromagnetic material linking the primary coil 19 with the secondary coils 14a, 14b, will be unequal. Within a considerable range of inclination. more windings on one detector coil will be linked by ferrofluid and correspondingly fewer windings on the other detector coil will be so linked. Even at greater inclinations, where one secondary coil is completely unlinked and the other is fully linked, changes in inclination of the loop will produce changes in the degree of coupling between the secondaries and the primary.

The physical asymmetry in the two transformers created in the manner just described by inclining loop 11 in the plane in which it lies produces a corresponding asymmetry in the voltage and current induced in detector windings 14a and 14b. In particular, the voltages induced in these windings will change in magnitude and shift in phase with respect to each other in accordance with well known transformer equations.

Figure 2:
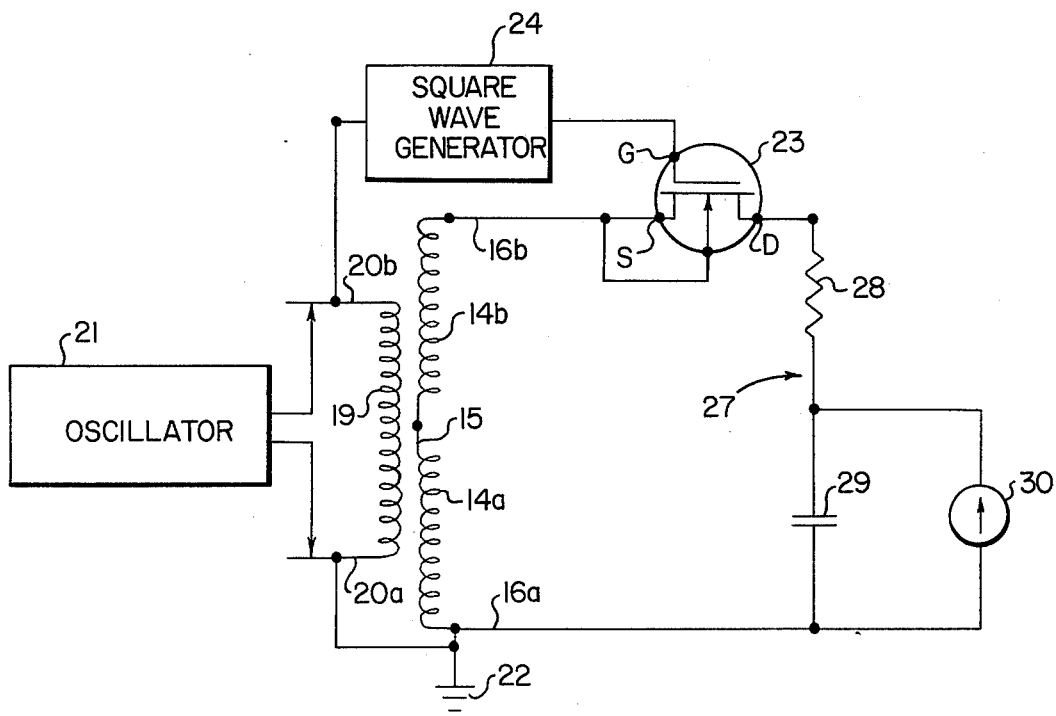
FIG. 2 is a diagram of electrical circuitry and equipment of the invention.

Attention is now directed to FIG. 2 which shows in circuit-and-block diagram form the electric aspects of the invention, and in particular, the means provided for deriving a comparison signal from the signals generated by detector coils 14a and 14b. In FIG. 2, the exciter and detector coils and certain lines are given the same reference characters as in FIG. 1 for consistency in discussion.

An oscillator 21, indicated by a block, is provided for driving exciter coil 19 by applying an alternating voltage across it. The structure of oscillator 21 is conventional. It is preferred that the wave shape of the applied voltage be sinusoidal, for reasons discussed below. Furthermore, it is preferred that the frequency of the applied voltage be relatively high; e.g., at least 60 and preferably 200 Hz or more. Frequencies in the range of 100 to 1000 Hz are quite satisfactory. The reason that a high frequency is desirable is a consequence of the fact that the ferrofluid 12 (FIG. 1) is a mobile liquid which will tend to move in tube 11 in a given direction upon the application of a voltage of a given sign to coil 19. Such movement is undesirable, and so is vibratory movement of the ferrofluid such as would result from application of a slowly alternating voltage to coil 19. The voltage frequency should thus be sufficiently high, in view of the viscosity (and density) of the ferrofluid, that substantially no electrically induced vibration of the fluid occurs. The more viscous the ferrofluid employed, the lower the frequency which can be tolerated.

One side of exciter coil 19 is grounded at 22, as is one end of detector coil 14a. The uncommon end of detector coil 14b is connected through line 16b to the source S and base B terminals of a field effect transistor (FET) 23. In addition to driving the coil 19, oscillator 21 drives square wave generator 24, which is conventional in structure and indicated by a block. The output of square wave generator 24 is a square voltage wave which is in phase with the oscillator voltage, and is delivered to the gate G of FET 23 through line 25. The drain D of FET 23 is connected to ground 22 through line 26, a series RC network 27 having a resistance 28 and a capacitor 29, and line 16a. A DC volt meter 30 is connected across capacitor 29.

The operation of the circuit just described is as follows: Because detector coils 14a and 14b are connected in series and are oppositely wound, the instantaneous voltages and currents induced in them add algebraically. When the inclinometer 10 (FIG. 1) is neutrally oriented, this sum is substantially zero, since the voltages (and currents) are equal in magnitude but opposite in sign and are in phase with each other. When the inclinometer is inclined, the instantaneous voltage sum shifts away from zero in one direction or the other as a result of phase and magnitude shifts in the voltages induced in coils 14a and 14b.

FET 23 acts as a bidirectional switch operated in phase with oscillator 21 through square wave generator 24. It admits the instantaneous voltage (and current) to R-C network 27. The steady state voltage across capacitor 29 is a function of its charging rate during half cycles when positive voltage is being applied to it and its discharge rate during half cycles when negative voltage is being applied to it, and these rates are in turn functions of the time integrals during each half wave of the instantaneous applied voltages.

The steady state voltage across capacitor 29 is detected by DC voltmeter 30. From the foregoing it can be seen that this voltage is proportional to the angle of inclination of the inclinometer 10, and that the voltage is of one sign when the inclination is on one side of vertical, and of the opposite sign when the inclination is on the other side of vertical.

The reason that a sinusoidal wave form in oscillator 21 is preferred is that it will produce sinusoidal waves in detector coils 14a and 14b which will have moderate slopes at the times they are switched by the FET 23, which is square wave actuated, thereby increasing accuracy of voltage delivery through the FET. Oscillators generating other wave forms may be employed, but are less satisfactory.

The voltage across capacitor 29 may be displayed for control use by drilling operators. It may be recorded for later use in logging calculations. It may be employed as an error signal source in a servo mechanism for establishing and maintaining a control torque on the drill string. It may be digitized in conventional manner for use in a computer for these and other purposes.

The equipment shown in FIG. 2, apart from the coils, may be located either in close proximity to the inclinometer 10 (FIG. 1) downhole, or remotely therefrom, at the surface. The downhole location has the advantage that only the voltage across capacitor 29 need be transmitted to the surface and that this may be done acoustically if desired. The disadvantages of a downhole location include the severe physical environment which must be accommodated, and the necessity of providing a downhole power supply.

Figure 3:
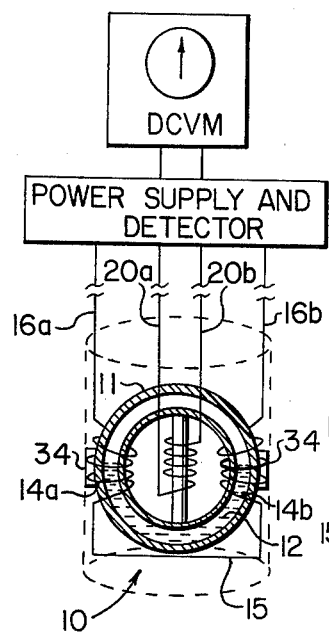
FIGS. 3, 4 and 5 are diagrammatic illustrations of the equipment of FIGS. 1 and 2, showing the mode of operation thereof.
Figure 4:
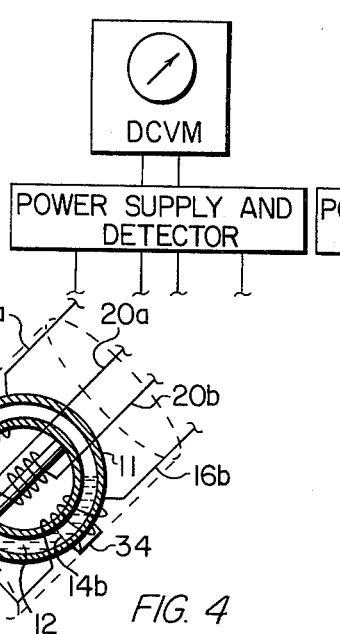
Figure 5:
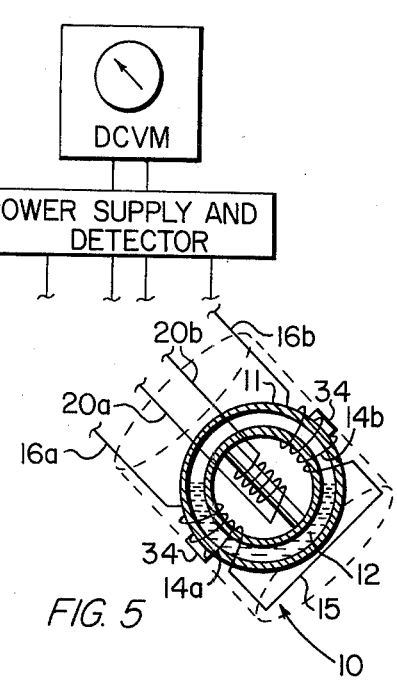

Attention is now directed to FIGS. 3, 4, and 5 which illustrate in diagrammatic form the mode of operation of the equipment shown in FIGS. 1 and 2 and described in detail in connection with those FIGS. In FIGS. 3–5, all of the equipment of FIG. 2 except the coils is assumed to be located on the surface, and this equipment is indicated by labeled block diagrams 31 and 32.

The inclinometer shown in the lower portion of FIGS. 3–5 is substantially the same as that shown in FIG. 1, and the same reference characters have accordingly been applied. The inclinometer 10 is shown as mounted in a cylindrical carrier device 33, which is shown in dotted outline, by means of mounting ears 34.

In FIG. 3, the carrier 33 and inclinometer 10 are vertically aligned and the ferrofluid 12 is linking detector coils 14a and 14b to the same extent. Accordingly the DC voltmeter 32 reads zero. In FIG. 4, the carrier 33 and inclinometer are tilted to the right as the FIG. is drawn. The ferrofluid 12 remains in the lowest portion of loop 11 and its relative position with respect to detector coils 14a and 14b is thus changed; ferrofluid 12 now links fewer of the turns of coil 14a and more of the turns of coil 14b. The two transformers are unbalanced and their unbalanced condition is converted in the manner described above to a positive DC voltage on DC voltmeter 32. In FIG. 5, the carrier 33 and inclinometer 10 are tilted to the left as the FIG. is drawn. Ferrofluid 12 again seeks the lowest portion of the loop and the coils 14a and 14b are shifted in location with respect to it. The ferrofluid links fewer turns of coil 14b and more of coil 14a; this condition generates the negative voltage appearing on DC voltmeter 32.

Figure 6:
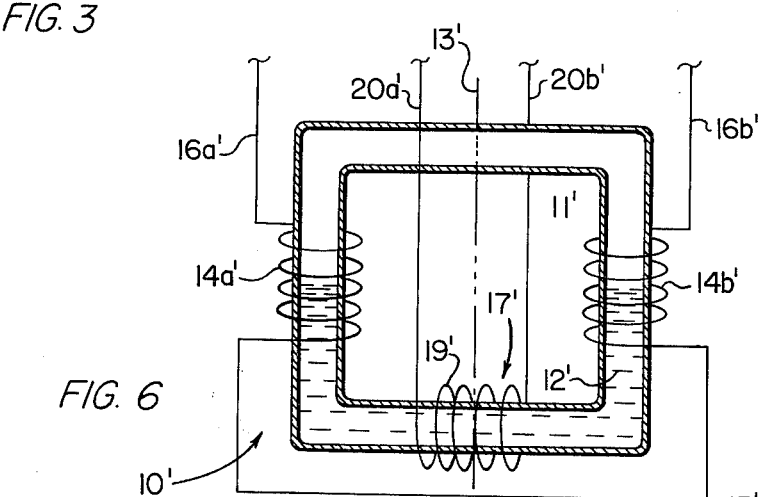
FIG. 6 is a diagrammatic elevational view of another embodiment of the invention.

FIG. 6 shows an alternate embodiment of the invention which differs from that of FIG. 1 in several respects. Corresponding parts are given the same reference characters with a prime (') added.

The inclinometer 10' of FIG. 6 has a loop 11' which is rectangular in configuration. The axis of symmetry 13' employed as a line of reference for positioning parts on the loop is one which bisects the short sides of the loop. Detector coils 14a' and 14b' are wound on the loop on opposite sides of axis of symmetry 13', and on the long legs of the loop. It is preferred that coils 14a' and 14b' extend along the legs in the region of the meniscus of the ferrofluid 12'.

The exciter coil means 17' in the embodiment of FIG. 6 comprises coil 19' wound around a portion of loop 11' lying between detector coils 14a' and 14b', and preferably on a portion which straddles axis of symmetry 13'.

Figure 7:
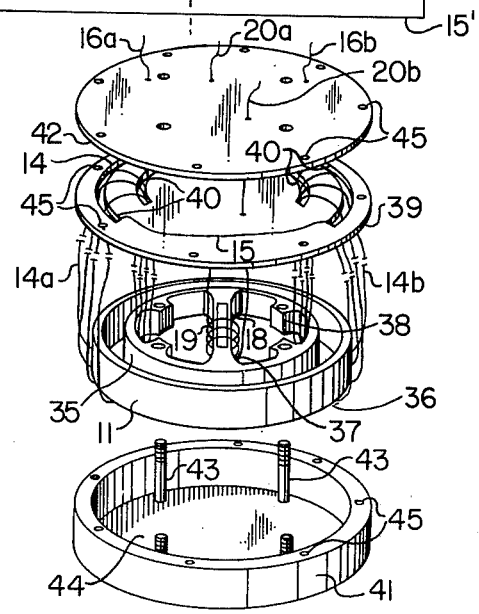
FIG. 7 is an exploded isometric view of an inclinometer constructed in accordance with FIG. 1, showing various constructional features of the invention.

FIG. 7 illustrates some constructional features of a very simple rugged embodiment of the invention suitable for use in a harsh downhole environment. The loop 11 is formed by cutting a circular trench 35 in a dough-nut shaped brass loop-piece 36. In this manner, uniformity of cross-section throughout the loop 11 is easily obtained. An axial bar 37 extends across the loop-piece 36; a slot is milled or otherwise formed in it to accommodate core piece 18. Bosses 38 are provided on loop-piece 36 to accommodate fastening means.

A loop-piece lid 39 is provided to cover trench 35 and core 18 and its winding 19. Loop-piece lid 39 is slotted at 40 adjacent major and minor circumferences of said loop piece so that windings 14a and 14b may be threaded through it. As a matter of order of assembly, core 18 is put in place and winding 19 is installed. The ferrofluid is then poured into trench 35, loop-piece lid 39 is put onto loop piece 36, and windings 14a and 14b are installed.

The loop piece and loop piece lid assembly is then mounted in a protective outer case comprising a hollow pan-shaped base member 41 and cover piece 42. Upstanding threaded posts 43 are positioned on the floor 44 of base member 41 to register with holes in bosses 38, lid 39, and cover 42. Nuts (not shown) are then threaded onto the ends of posts 43 to secure the parts together. In addition bolts (not shown) are passed through a series of circumferentially spaced aligned holes 45 in base member 41, lid 39, and cover 42 to further secure the parts together.

Lines 16a, 16b, and 20 are passed through small holes in cover 42.

With the foregoing description of the equipment of the invention in hand, some of its special advantages and features can now be outlined. First, it should be noted that the provision of a closed loop results in the ferrofluid being exposed to the same vapor pressure and vapor temperature conditions on both sides of the axis of symmetry. No special compensation steps or means are thus required. Next, it should be observed that the physical configuration of the loop and coils (particularly the embodiment of FIG. 1, but also the embodiment of FIG. 6 to a lesser extent) yields an inherent linearity of electrical response, thus simplifying the electrical equipment needed for signal processing.

The equipment, in addition to being vibration resistant, is very impact resistant. If the loop is jarred so violently that some of the ferrofluid is splashed up into the vapor space of the loop, reducing temporarily the volume acting as a liquid transformer core, no permanent damage is done because the splashed liquid will eventually drain back down into the main body of liquid.

The inclinometer of the invention can readily be proportioned to fit in the restricted confines of a downhole instrument. A loop diameter of two inches or even less is quite practical.

From the foregoing it can be seen that the present invention provides a simple, rugged inclinometer with no mechanical moving parts which is very well adapted for use as a top hole indicator as well as in many other applications.

What is claimed is:

1. An inclinometer for use as a top-hole indicator comprising:
   a dough-nut shaped loop piece having a circular trench formed therein that is concentric with the loop piece, said loop piece having a bar extending thereacross with a slot formed therein;
   a ferrofluid partially filling said trench;
   a core piece positioned in said slot;
   exciter coil windings wrapped around said bar;
   a loop piece lid on said loop piece, said lid having two pairs of arcuate slots therein adjacent major and minor circumferences of said loop piece;
   detector coil windings wrapped around said loop piece and through said arcuate slots;
   and an outer case comprising a pan-shaped base member and a cover piece containing and enclosing said loop piece and loop piece lid.

* * * * *